United States Patent [19]

Kindig et al.

[11] 4,257,881

[45] Mar. 24, 1981

[54] PROCESS FOR BENEFICIATING OXIDE ORES

[75] Inventors: James K. Kindig, Arvada; Ronald L. Turner, Golden, both of Colo.

[73] Assignee: Hazen Research, Inc., Golden, Colo.

[21] Appl. No.: 921,583

[22] Filed: Jul. 3, 1978

Related U.S. Application Data

[63] Continuation-in-part of Ser. No. 868,416, Jan. 10, 1978, abandoned, which is a continuation-in-part of Ser. No. 658,258, Feb. 17, 1976, abandoned.

[51] Int. Cl.$^2$ ............................................. C22B 1/00
[52] U.S. Cl. ................................. 75/1 R; 209/214; 209/8; 427/252; 427/253; 427/132
[58] Field of Search ............. 75/1 R, 1 T, 21, 28, 75/62, 72, 77, 82, 87, 111, 122; 423/231, 138, 25; 209/212, 213, 214, 8; 427/47, 252, 254, 253, 255, 132

[56] References Cited

U.S. PATENT DOCUMENTS

| | | | |
|---|---|---|---|
| 1,053,486 | 2/1913 | Ethenington | 75/1 R |
| 1,789,813 | 1/1931 | Gaus | 75/1 T |
| 2,132,404 | 10/1938 | Dean et al. | 423/25 |
| 2,332,309 | 10/1943 | Drummond | 427/252 |
| 2,612,440 | 9/1952 | Altmann | 75/0.5 |
| 2,944,883 | 7/1960 | Queneau et al. | 75/0.5 |
| 3,220,875 | 11/1965 | Queneau | 474/217 |
| 3,252,791 | 5/1966 | Frysinger et al. | 75/119 |
| 3,323,903 | 6/1967 | O'Neill et al. | 75/0.5 |
| 3,466,167 | 9/1969 | Illis et al. | 75/112 |
| 3,490,899 | 1/1920 | Krivisky et al. | 423/25 |
| 3,669,644 | 6/1972 | Sato | 423/25 |
| 3,938,966 | 2/1976 | Kindig et al. | 44/1 R |
| 3,977,862 | 8/1976 | Glacser | 75/1 T |
| 4,056,386 | 11/1977 | McEway et al. | 423/417 |
| 4,098,584 | 7/1978 | Kindig et al. | 44/1 R |

FOREIGN PATENT DOCUMENTS

| | | | |
|---|---|---|---|
| 179095 | 7/1954 | Austria | 75/112 |
| 119156 | 8/1959 | U.S.S.R. | 208/212 |
| 119179 | 8/1959 | U.S.S.R. | 75/1 T |

*Primary Examiner*—L. Dewayne Rutledge
*Assistant Examiner*—Michael L. Lewis
*Attorney, Agent, or Firm*—Sheridan, Ross, Fields & McIntosh

[57] ABSTRACT

One or more mineral values of metal oxide ores selected from the group consisting of bauxite, taconite, apatite, titanium oxides and the metal oxides of Groups, IIIB, IVB, VB VIB, VIIB, VIIIB, IB, IIB and IVA are beneficiated by treating the ore with a metal containing compound under conditions such as to selectively enhance the magnetic susceptibility of the mineral values to the exclusion of the gangue in order to permit a physical separation between the values and gangue.

60 Claims, No Drawings

PROCESS FOR BENEFICIATING OXIDE ORES

CROSS REFERENCE TO RELATED APPLICATIONS

This application is a continuation-in-part of copending application Ser. No. 868,416 filed Jan. 10, 1978, now abandoned, which is a continuation-in-part of now abandoned application Ser. No. 658,258 filed Feb. 17, 1976, now abandoned.

BACKGROUND OF THE INVENTION

1. Field of the Invention

This invention relates to a means for treating ores to separate the mineral values from gangue material by selectively enhancing the magnetic susceptibility of the mineral values so that they may be magnetically removed from the gangue.

2. Description of the Prior Art

As is well known, mining operations in the past for recovering various metals, e.g., lead, copper, have utilized high grade ore deposits where possible. Many of these deposits have been exhausted and mining of lower grade ores is increasing. The processing of these leaner ores consumes large amounts of time, labor, reagents, power and water with conventional processing.

In addition to the increased expense associated with the extraction of these metals from low grade ores, proposed processes for separation of certain of the sulfide ores are technically very difficult and involve elaborate and expensive equipment. In many cases the expense incurred by such separation would be greater than the commercial value of the metal, such that the mineral recovery, while theoretically possible, is economically unfeasible.

Accordingly, it is a principal object of this invention to provide a method of treating metal oxide ores which separates the mineral values from gangue material by selectively enhancing the magnetic susceptibility of one or more mineral values in order that they may be magnetically removed from the gangue.

SUMMARY OF THE INVENTION

The process of the present invention entails treating a metal oxide ore selected from the group consisting of bauxite, taconite, apatite, titanium oxides and the metal oxides of Groups IIIB, IVB, VB, VIB, VIIB, VIIIB, IB, IIB and IVA with a metal containing compound under processing conditions such that the magnetic susceptibility of the ore is selectively enhanced to the exclusion of the gangue. The affected ore values may then be magnetically separated from the less magnetic constituents.

Additionally, an improved beneficiation of many of these ores can be obtained by cotreating the ore with a metal containing compound and a reducing gas under processing conditions such as to selectively enhance the magnetic susceptibility of the mineral values to the exclusion of the gangue in order to permit a physical separation of the values from the gangue.

DESCRIPTION OF THE PREFERRED EMBODIMENTS

The process of the present invention is particularly useful for concentrating metal oxide minerals. The process employs the treatment of the ore with a metal containing compound or the cotreatment of the ore with a metal containing compound and a reducing gas in order to selectively enhance the magnetic susceptibility of various mineral values contained within the ore. The treated mixture can then be subjected to a physical separation process to produce a beneficiated product.

"Enhancing the magnetic susceptibility" of the ore as used herein is intended to be defined in accordance with the following discussion. Every compound of any type has a specifically defined magnetic susceptibility, which refers to the overall attraction of the compound to a magnetic force. An alteration of the surface magnetic characteristics will alter the magnetic susceptibility. Both the metal containing compound treatment and the metal and gas cotreatment of the inventive process alter the surface characteristics of the ore particles in order to enhance the magnetic susceptibility of the particles. It is to be understood that the magnetic susceptibility of the particle is not actually changed, but the particle itself is changed, at least at its surface, resulting in a particle possessing a greater magnetic susceptibility than the original particle. For convenience of discussion, this alteration is termed herein as "enhancing the magnetic susceptibility" of the particle or ore itself.

The metal oxide minerals which are capable of undergoing a selective magnetic enhancement in accordance with the process include the metal oxides of Groups IIIB, IVB, VB, VIB, VIIB, VIIIB, IB, IIB and IVA, the titanium oxides of Group IVB, aluminum hydrate, i.e. bauxite, of Group IIIA, taconite and apatite. It is recognized that taconite and apatite are generally classified as a type of silicate and phosphate, respectively, and it is further recognized that apatite does not contain elements generally classified as metals (other than calcium). However, for the purposes of this inventive process they are classified as metal oxides. The preferred oxide minerals include bauxite, rutile, taconite, apatite, pyrochlore, uraninite, cuprite, cassiterite, carnotite, scheelite and hematite.

The gangue minerals from which the metal oxide ores can be separated include those minerals which do not undergo a sufficient magnetic susceptibility enhancement as a result of the process. These gangue minerals include, for example, silica, alumina, gypsum, muscovite, dolomite, calcite, albite and feldspars, as well as various other minerals.

In those ores which contain naturally relatively strongly magnetic constituents, such as magnetite, the magnetic material may first be removed by passing the mixture through a magnetic separator. The nonmagnetic portion obtained by this precleaning step is then subjected to the treatment with a metal containing compound or cotreatment with a metal containing compound and the reducing gas.

Prior to either of the treatments, the ore must be ground to liberate the metal oxide particles from the gangue particles, if the respective components do not already exist in this liberated state. The ore may be crushed finer than necessary to achieve liberation, but this is not generally economically possible. It is generally satisfactory to crush the ore to minus 14 mesh, although some ores require finer mesh sizes.

Numerous metal containing compounds are capable of enhancing the magnetic susceptibility of these metal oxides in accordance with the invention. Many iron containing compounds possess the capability of enhancing the magnetic susceptibility of the mineral values of the ore, as long as the compound is adaptable so as to bring the iron in the compound into contact with the mineral value under conditions such as to cause an alteration of at least a portion of the surface of the mineral value.

Iron containing compounds capable of exerting sufficient vapor pressure, with iron as a component in the vapor, so as to bring the iron into contact with the value at the reaction temperature are suitable, as well as other organic and inorganic iron containing compounds which can be dissolved and/or "dusted" and brought into contact with the mineral value contained within the ore. Preferred compounds within the vapor pressure group are those which exert a vapor pressure, with iron as a component in the vapor, of at least about 10 millimeters of mercury, more preferably of at least about 25 millimeters of mercury and most preferably of at least about 50 millimeters of mercury at the reaction temperature. Examples of groupings which fall within this vapor pressure definition include ferrocene and its derivatives and beta-diketone compounds of iron. Specific examples include ferrocene and iron acetylacetonate.

Other organic compounds which may be utilized to enhance the magnetic susceptibility include those which may be homogeneously mixed with a carrier liquid and brought into contact with the components of the ore. Such mixtures include, for example solutions, suspensions and emulsions. These compounds must be such as to provide sufficient metal to contact the surface of the mineral value. Suitable carrier liquids include, for example, acetone, petroleum, ether, naphtha, hexane, benzene and water; but this, of course, is dependent upon the particular metal compound being employed. Specific groupings include, for example, ferrocene and its derivatives and the carboxylic acid salts of iron, such as, iron octoate, iron naphthenate, iron stearate and ferric acetylacetonate.

Additionally, solid organic iron containing compounds capable of being directly mixed with the ore in solid form possess the capability of enhancing the magnetic susceptibility of the metal sulfides. The compound must be in solid form at the mixing temperature and be of sufficiently fine particle size in order to be able to be well dispersed throughout the ore. The particle size is preferably smaller than about 20-mesh, more preferably smaller than about 100-mesh, and most preferably smaller than about 400-mesh. Compounds within this grouping include ferrocene and its derivatives, iron salts of organic acids, and beta-diketone compounds of iron. Specific examples include ferrous formate, 1,1'-diacetyl ferrocene, and 1,1'-dihydroxymethyl ferrocene.

Various inorganic compounds are also capable of producing an enhanced magnetic susceptibility. Preferred inorganic compounds include ferrous chloride, ferric chloride and the metal carbonyls, including, for example, iron, nickel, cobalt, molybdenum, tungsten and chromium carbonyls and derivatives of these compounds. Iron carbonyl is a preferred carbonyl for imparting this magnetic susceptibility, particularly iron pentacarbonyl, iron dodecacarbonyl and iron nonacarbonyl. The more preferred metal containing compounds capable of enhancing the magnetic susceptibility are iron pentacarbonyl, ferrocene, ferric acetylacetonate, ferrous chloride and ferric chloride, with iron pentacarbonyl being the most preferred.

The process is applied by contacting the iron containing compound with the ore at a temperature wherein the iron containing compound selectively decomposes or otherwise reacts at the surface of the metal oxide particles to alter their surface characteristics, while remaining essentially unreactive, or much less reactive, at the surface of the gangue particles. The temperature of the reaction is a critical parameter, and dependent primarily upon the particular compound and the particular ore, and also the cotreating gas, in the case of the cotreatment process. The preferred temperature can be determined by heating a sample of the specific iron containing compound and the specific ore together until the decomposition reaction occurs. Suitable results generally occur over a given temperature range for each system. Generally, temperatures above the range cause non-selective decomposition while temperatures below the range are insufficient for the reaction to occur.

While as indicated above, techniques other than vapor injection methods may be employed as applicable depending upon the metal containing compound being utilized, the following discussion primarily applies to vapor injection techniques, specifically iron pentacarbonyl, as these are generally preferred. Similar considerations, as can be appreciated, apply to the other described techniques.

The preferred temperatures when iron pentacarbonyl is employed as the treating gas are primarily dependent upon the ore being treated and in the case of the cotreatment process, the cotreatment gas being utilized. It is generally preferred to select a temperature which is within a range of 125° C., more preferably 50° C., and most preferably 15° C. less than the general decomposition temperature of the iron carbonyl in the specific system. The general decomposition temperature is intended to mean the temperature at which the iron carbonyl decomposes into iron and carbon monoxide in an indiscriminate fashion, causing a magnetic enhancement of the gangue as well as the metal oxide. The "specific system" is intended to include all components and parameters, other than, of course, temperature, of the precise treatment, as the general decomposition temperature generally varies with different components and/or different parameters. This decomposition temperature range can be readily determined by analytical methods, and often a trial and error approach is preferred to determine the precise temperature range for each specific system.

The amount of the metal containing compound used and the time of treatment can be varied to maximize the selective enhancement treatment. With respect to iron carbonyl the preferred amount employed is from about 0.1 to about 100 kilograms per metric ton of feed, more preferably from about 1 to about 50 kilograms per metric ton of feed, and most preferably from about 2 to 20 kilograms per metric ton of feed. The reaction is generally conducted for a period of time of from about 0.05 to about 4 hours, more preferably from about 0.15 to about 2 hours, and most preferably from about 0.25 to about 1 hour.

The particular process of the invention concerns treating the ore with a metal containing compound. Another embodiment of this invention entails cotreating the ore with a metal containing compound while simultaneously treating the ore with a reducing gas. Preferred gases include those selected from the group consisting of hydrogen, carbon monoxide, ammonia, and lower hydrocarbons in the range of about $C_1$ to $C_8$, particularly including methane, ethane, ethylene, propane, propylene, butane and butylene, as well as other similar reducing gases. These gases in and of themselves have no appreciable effect upon the magnetic susceptibility of the mineral values; however, they can significantly improve the results obtained over the metal containing compound treatments alone.

The metal containing compound and the gas may be introduced into the reaction chamber together or simultaneously from different inlets, as long as the reducing gas is available to the metal containing compound during the treatment.

The type and amount of gas will depend to some extent upon the metal containing compound being used. Generally, the gas will be employed at a concentration of preferably at least about 1 percent, more preferably at least about 10 percent and most preferably about 100 percent of the reactor atmosphere.

Neither of the processes of this invention are especially useful in beneficiating oxide ores which are highly naturally magnetic since such ores can be beneficiated by subjecting them to a magnetic separation process or first heating them before the magnetic process. An example of such an ore is pyrolusite.

After the feed mixture containing the metal oxide values has been treated with a metal containing compound, it can then be subjected to a physical separation process to effect the separation of the treated metal oxides from the gangue. Any of many commercially available magnetic separators can be used to remove these values from the gangue. For example, low or medium intensity separations can be made with a permanent magnetic drum separator, electromagnetic drum separators, induced roll separators or other configurations known to those skilled in the art. Since most oxides are liberated at a mesh size of 65 mesh or finer, a wet magnetic separation process is more effective. Thus, high intensity, high gradient wet magnetic separators are preferred. Also, electrostatic techniques may be employed as the primary separation means, or in addition to the magnetic separation means. The selective change in surface characteristics changes the electrical conductivity of the particle in analogous fashion to changing the particle's magnetic characteristics. Additionally, due to the fact that the oxide surface characteristics have been altered, the oxides are often more amenable to processes such as flotation and chemical leaching.

EXAMPLE 1

A sample of taconite from the Mesabi range was prepared by crushing to minus 14 by 200-mesh, and passing it through a Stearns cross-belt magnetic separator to remove any naturally magnetic material. Twenty-seven grams of the non-magnetic fraction thus obtained were placed in a small glass rotating reactor and heated to 190°–195° C. while iron carbonyl was injected into the chamber during a 60-minute interval, providing a total of 4 kilograms of iron carbonyl per metric ton of taconite ore. The treated product was again passed through the magnetic separator, forming a magnetic fraction and a nonmagnetic fraction.

The results of the above test are set forth in the following table:

TABLE 1

|  | Weight Percent Of Sample | Iron Analysis, Percent | Iron Distribution, Percent |
|---|---|---|---|
| Concentrate (Magnetic) | 34.3 | 5.77 | 58.6 |
| Gangue (Nonmagnetic) | 65.7 | 2.13 | 41.4 |
| Feed | 100.0 | 3.38 | 100.0 |

EXAMPLE 2

Samples of different minerals were ground to 65-mesh and mixed with minus 65-mesh silica sand to produce 3% synthetic ores with the exception of carnotite which is a 5% ore. Each sample was treated for a period of 30 minutes with 8 kilograms of iron carbonyl per metric ton of ore. The iron carbonyl was injected as a vapor during the first 10 minutes of this 30 minute treatment. The temperature of the treatment varied for the different minerals. Additionally, for each sample treated with iron carbonyl another sample was run under the identical conditions with the omission of the iron carbonyl in order to obtain comparative data. All of the samples with the exception of hematite were subjected to a wet magnetic separation process which utilized a current of 2 amperes in the magnetic coils. The magnetic separation of hematite utilized a current of 0.2 amperes in the magnetic coils. Data are presented in Table 2 (Figures contained within brackets in Table 2 denote calculated amounts).

TABLE 2

| MINERAL | TEMP. °C. | $Fe(CO)_5$ DOSAGE (kg./m.ton) | PRODUCT | WEIGHT (%) | GRADE (%) | METAL | METAL OXIDE DISTRIBUTION (%) |
|---|---|---|---|---|---|---|---|
| Pyrochlore | 124 | 8 | Magnetic | 7.7 | .61 | Cb | 31.6 |
|  |  |  | Nonmagnetic | 92.3 | .11 | Cb | 68.4 |
|  |  |  | Calculated feed | 100.0 | .149 | Cb | 100.0 |
| Pyrochlore | 124 | 0 | Magnetic | .90 | 2.0 | Cb | 16.2 |
|  |  |  | Nonmagnetic | 99.10 | .094 | Cb | 83.8 |
|  |  |  | Calculated feed | 100.0 | .111 | Cb | 100.0 |
| Uraninite | 130 | 8 | Magnetic | .95 | .087 | U | 89.2 |
|  |  |  | Nonmagnetic | 99.05 | (.0001) | U | 10.8 |
|  |  |  | Calculated feed | 100.0 | (.00093) | U | 100.0 |
| Uraninite | 130 | 0 | Magnetic | .59 | .10 | U | 62.1 |
|  |  |  | Nonmagnetic | 99.41 | (.00036) | U | 37.9 |
|  |  |  | Calculated feed | 100.0 | (.0095) | U | 100.0 |
| Cuprite | 125 | 8 | Magnetic | 2.1 | .165 | Cu | 46.9 |
|  |  |  | Nonmagnetic | 77.9 | .004 | Cu | 53.1 |
|  |  |  | Calculated feed | 100.0 | .0074 | Cu | 100.0 |
| Cuprite | 125 | 0 | Magnetic | .54 | .417 | Cu | 31.2 |
|  |  |  | Nonmagnetic | 99.46 | .005 | Cu | 68.8 |
|  |  |  | Calculated feed | 100.0 | .0073 | Cu | 100.0 |
| Cassiterite | 128 | 8 | Magnetic | 3.5 | 4.83 | Sn | 14.9 |
|  |  |  | Nonmagnetic | 96.5 | .998 | Sn | 85.1 |

TABLE 2-continued

| MINERAL | TEMP. °C. | Fe(CO)5 DOSAGE (kg./m.ton) | PRODUCT | WEIGHT (%) | GRADE (%) | METAL | METAL OXIDE DISTRIBUTION (%) |
|---|---|---|---|---|---|---|---|
| | | | Calculated feed | 100.0 | 1.13 | Sn | 100.0 |
| Cassiterite | 128 | 0 | Magnetic | .65 | 23.6 | Sn | 10.8 |
| | | | Nonmagnetic | 99.35 | 1.25 | Sn | 89.2 |
| | | | Calculated feed | 100.0 | 1.39 | Sn | 100.0 |
| Rutile | 130 | 8 | Magnetic | 26.8 | 4.40 | Ti | 72.9 |
| | | | Nonmagnetic | 73.2 | 0.06 | Ti | 27.1 |
| | | | Calculated feed | 100.0 | 1.62 | Ti | 100.0 |
| Rutile | 130 | 0 | Magnetic | .96 | 29.1 | Ti | 16.4 |
| | | | Nonmagnetic | 99.04 | 1.44 | Ti | 83.6 |
| | | | Calculated feed | 100.0 | 1.71 | Ti | 100.0 |
| Bauxite | 150 | 8 | Magnetic | 18.3 | 2.87 | Al | 84.0 |
| | | | Nonmagnetic | 81.7 | .122 | Al | 16.0 |
| | | | Calculated feed | 100.0 | .625 | Al | 100.0 |
| Bauxite | 144 | 8 | Magnetic | 3.3 | 20.1 | Al | 98.0 |
| | | | Nonmagnetic | 96.7 | .014 | Al | 2.0 |
| | | | Calculated feed | 100.0 | .677 | Al | 100.0 |
| Bauxite | 144 | 0 | Magnetic | .81 | 17.0 | Al | 18.7 |
| | | | Nonmagnetic | 99.19 | .605 | Al | 81.3 |
| | | | Calculated feed | 100.0 | .738 | Al | 100.0 |
| Carnotite | 145 | 8 | Magnetic | 1.4 | .731 | $U_3O_8$ | 35.3 |
| | | | Nonmagnetic | 98.6 | .019 | $U_3O_8$ | 64.7 |
| | | | Calculated feed | 100.0 | .029 | $U_3O_8$ | 100.0 |
| Carnotite | 145 | 0 | Magnetic | .67 | .297 | $U_3O_8$ | 6.7 |
| | | | Nonmagnetic | 99.33 | .028 | $U_3O_8$ | 93.3 |
| | | | Calculated feed | 100.0 | .030 | $U_3O_8$ | 100.0 |
| Scheelite | 135 | 8 | Magnetic | 27.4 | 2.85 | W | 58.6 |
| | | | Nonmagnetic | 72.6 | .76 | W | 41.4 |
| | | | Calculated feed | 100.0 | 1.33 | W | 100.0 |
| Scheelite | 135 | 0 | Magnetic | 2.1 | 2.44 | W | 4.1 |
| | | | Nonmagnetic | 97.9 | 1.23 | W | 95.9 |
| | | | Calculated feed | 100.0 | 1.25 | W | 100.0 |
| Hematite | 125 | 8 | Magnetic | 1.14 | 36.2 | Fe | 34.0 |
| | | | Nonmagnetic | 98.86 | .81 | Fe | 66.0 |
| | | | Calculated feed | 100.0 | 1.21 | Fe | 100.0 |
| Hematite | 125 | 0 | Magnetic | .10 | 22.9 | Fe | 3.0 |
| | | | Nonmagnetic | 99.90 | .73 | Fe | 97.0 |
| | | | Calculated feed | 100.0 | .752 | Fe | 100.0 |
| Apatite | 125 | 8 | Magnetic | 4.9 | 7.10/4.0/.90 | Ca/P/F | 36.5/39.9/39.8 |
| | | | Nonmagnetic | 95.1 | .64/.31/.07 | Ca/P/F | 63.5/60.1/60.2 |
| | | | Calculated feed | 100.0 | .096/.491/.111 | Ca/P/F | 100.0 |
| Apatite | 125 | 0 | Magnetic | .41 | 1.95/.34 | Ca/P | 0.7/0.7 |
| | | | Nonmagnetic | 99.59 | 1.09/.36 | Ca/P | 99.3/99.3 |
| | | | Calculated feed | 100.0 | 1.09/.360 | Ca/P | 100.0 |
| Apatite | 115 | 8 | Magnetic | .57 | 8.94/4.4/1.10 | Ca/P/F | 3.7/4.1/4.1 |
| | | | Nonmagnetic | 99.43 | 1.34/.59/.14 | Ca/P/F | 96.3/95.9/95.9 |
| | | | Calculated feed | 100.0 | 1.38/.613/.145 | Ca/P/F | 100.0 |

EXAMPLE 3

Samples of different minerals were mixed with silica sand to produce 3% synthetic ores with the exception of carnotite which is a 5% synthetic ore. Some samples were treated with ferrocene which had been dissolved in petroleum ether. This ferrocene was mixed with the ore sample and then the petroleum ether was evaporated off. Thereafter, the material was placed in a reactor and the temperature was raised to 400° C. over a two-hour period. The remaining samples were treated exactly the same with the omission of ferrocene in order to obtain comparative data. Table 3 shows the comparative results.

TABLE 3

| MINERAL | TEMP °C. | Ferrocene DOSAGE (kg./m.ton) | FRACTION | WEIGHT (%) | GRADE (%) | METAL | METAL OXIDE DISTRIBUTION (%) |
|---|---|---|---|---|---|---|---|
| Bauxite | 400 | 16 | Magnetic | 3.4 | 14.3 | Al | 86.3 |
| | | | Nonmagnetic | 96.6 | .08 | Al | 13.7 |
| | | | Calculated feed | 100.0 | .563 | Al | 100.0 |
| Bauxite | 400 | 0 | Magnetic | 2.4 | 17.7 | Al | 64.5 |
| | | | Nonmagnetic | 97.6 | .24 | Al | 35.5 |
| | | | Calculated feed | 100.0 | .659 | Al | 100.0 |
| Scheelite | 400 | 16 | Magnetic | 3.3 | 1.96 | W | 15.0 |
| | | | Nonmagnetic | 96.7 | .38 | W | 85.0 |
| | | | Calculated feed | 100.0 | .432 | W | 100.0 |
| Scheelite | 400 | 0 | Magnetic | 1.25 | 1.36 | W | 3.8 |
| | | | Nonmagnetic | 98.75 | .43 | W | 96.2 |
| | | | Calculated feed | 100.0 | .442 | W | 100.0 |
| Carnotite | 400 | 16 | Magnetic | 8.0 | .193 | $U_3O_8$ | 52.8 |
| | | | Nonmagnetic | 92.0 | .015 | $U_3O_8$ | 47.2 |
| | | | Calculated feed | 100.0 | .029 | $U_3O_8$ | 100.0 |
| Carnotite | 400 | 0 | Magnetic | 1.07 | .410 | $U_3O_8$ | 15.1 |
| | | | Nonmagnetic | 98.93 | .025 | $U_3O_8$ | 84.9 |

TABLE 3-continued

| MINERAL | TEMP °C. | Ferrocene DOSAGE (kg./m.ton) | FRACTION | WEIGHT (%) | GRADE (%) | METAL | METAL OXIDE DISTRIBUTION (%) |
|---|---|---|---|---|---|---|---|
| | | | Calculated feed | 100.0 | .029 | U₃O₈ | 100.0 |
| Apatite | 400 | 16 | Magnetic | 5.1 | 5.14/2.1/.49 | Ca/P/F | 27.9/26.1/27.3 |
| | | | Nonmagnetic | 94.9 | .714/.32/.07 | Ca/P/F | 72.1/73.9/72.7 |
| | | | Calculated feed | 100.0 | .940/.411/.091 | Ca/P/F | 100.0 |
| Apatite | 400 | 0 | Magnetic | .54 | 1.22 | P | 1.5 |
| | | | Nonmagnetic | 99.46 | 0.43 | P | 98.5 |
| | | | Calculated Feed | 100.0 | 0.435 | P | 100.0 |
| Cuprite | 400 | 16 | Magnetic | 2.2 | 36.9 | Cu | 86.5 |
| | | | Nonmagnetic | 97.8 | 0.130 | Cu | 13.5 |
| | | | Calculated feed | 100.0 | 0.939 | Cu | 100.0 |
| Cuprite | 400 | 0 | Magnetic | 1.52 | 28.5 | Cu | 46.8 |
| | | | Nonmagnetic | 98.48 | 0.500 | Cu | 53.2 |
| | | | Calculated feed | 100.0 | 0.926 | Cu | 100.0 |
| Uraninite | 400 | 16 | Magnetic | 12.2 | 0.030 | U₃O₈ | 67.6 |
| | | | Nonmagnetic | 87.8 | 0.002 | U₃O₈ | 32.4 |
| | | | Calculated feed | 100.0 | 0.0054 | U₃O₈ | 100.0 |
| Uraninite | 400 | 0 | Magnetic | 1.4 | 0.100 | U₃O₈ | 26.2 |
| | | | Nonmagnetic | 98.6 | 0.004 | U₃O₈ | 73.8 |
| | | | Calculated feed | 100.0 | 0.0053 | U₃O₈ | 100.0 |

EXAMPLE 4

Samples of 3% synthetic ores (carnotite is a 5% synthetic ore) were treated with 16 kilograms of vaporized ferric acetylacetonate per metric ton of ore at a temperature of 270° C. for a period of 30 minutes. Samples identical in composition were subjected to the same treatment with the omission of the ferric acetylacetonate. The comparative results are shown in Table 4.

TABLE 4

| Mineral | Temp. °C. | Dosage (kg./m./ton) | Fraction | Weight (%) | Grade (%) | Metal | Metal Oxide Distribution, (%) |
|---|---|---|---|---|---|---|---|
| Bauxite | 270 | 16 | Magnetic | 2.4 | 18.9 | Al | 69.9 |
| | | | Nonmagnetic | 97.6 | 0.20 | Al | 30.1 |
| | | | Calculated feed | 100.0 | 0.649 | Al | 100.0 |
| Bauxite | 270 | 0 | Magnetic | 1.6 | 24.4 | Al | 48.0 |
| | | | Nonmagnetic | 98.4 | 0.43 | Al | 52.0 |
| | | | Calculated feed | 100.0 | 0.814 | Al | 100.0 |
| Scheelite | 270 | 16 | Magnetic | 3.1 | 0.96 | W | 7.7 |
| | | | Nonmagnetic | 96.9 | 0.37 | W | 92.3 |
| | | | Calculated feed | 100.0 | 0.389 | W | 100.0 |
| Scheelite | 270 | 0 | Magnetic | 1.3 | 1.09 | W | 3.3 |
| | | | Nonmagnetic | 98.7 | 0.42 | W | 96.7 |
| | | | Calculated feed | 100.0 | 0.429 | W | 100.0 |
| Carnotite | 270 | 16 | Magnetic | 1.2 | 0.418 | U₃O₈ | 25.3 |
| | | | Nonmagnetic | 98.8 | 0.015 | U₃O₈ | 74.7 |
| | | | Calculated feed | 100.0 | 0.020 | U₃O₈ | 100.0 |
| Carnotite | 270 | 0 | Magnetic | 0.97 | 0.514 | U₃O₈ | 21.9 |
| | | | Nonmagnetic | 99.03 | 0.018 | U₃O₈ | 78.1 |
| | | | Calculated feed | 100.00 | 0.023 | U₃O₈ | 100.0 |
| Apatite | 270 | 16. | Magnetic | 2.3 | 2.28/.96/.25 | Ca/P/F | 6.9/5.8/6.1 |
| | | | Nonmagnetic | 97.7 | .720/.37/.09 | Ca/P/F | 93.1/94.2/94.9 |
| | | | Calculated feed | 100.0 | .755/.384/.094 | Ca/P/F | 100.0 |
| Apatite | 270 | 0 | Magnetic | 0.34 | 0.637 | P | 0.5 |
| | | | Nonmagnetic | 99.66 | 0.427 | P | 99.5 |
| | | | Calculated feed | 100.00 | 0.428 | P | 100.00 |

EXAMPLE 5

Several samples of 3% synthetic ores were cotreated with 8 kilograms of iron pentacarbonyl per metric ton of ore and a reducing gas. Each of the cotreatment samples were heated, then the system was purged with the reducing gas for 15 minutes at a flow rate such that one reactor volume of reducing gas was introduced into the system every 4.3 minutes. This was immediately followed by treatment with iron carbonyl for 30 minutes with the iron carbonyl being injected during the first 10 minutes of treatment. Samples of the same ores were treated under the same conditions with only the reducing gas. All of the samples except hematite were subjected to a wet magnetic separation process which utilized a current of 2.0 amperes in the magnetic coils. The magnetic separation of hematite was conducted with a current of 0.2 amperes in the magnetic coils. The comparative results are shown in Table 5 (Figures given in brackets in Table 5 denote calculated amounts).

TABLE 5

| MINERAL (TEMP. °C.) | GAS | Fe(CO)₅ DOSAGE (kg./m.ton) | PRODUCT | WEIGHT (%) | GRADE (%) | METAL | METAL OXIDE DISTRIBUTION (%) |
|---|---|---|---|---|---|---|---|
| Bauxite (144) | H₂ | 8 | Magnetic | 16.0 | 3.62 | Al | 93.2 |
| | | | Nonmagnetic | 84.0 | .05 | Al | 6.8 |
| | | | Calculated feed | 100.0 | .621 | Al | 100.0 |

TABLE 5-continued

| MINERAL (TEMP. °C.) | GAS | Fe(CO)5 DOSAGE (kg./m.ton) | PRODUCT | WEIGHT (%) | GRADE (%) | METAL | METAL OXIDE DISTRIBUTION (%) |
|---|---|---|---|---|---|---|---|
| Bauxite (144) | H2 | 0 | Magnetic | .94 | 14.7 | Al | 21.5 |
|  |  |  | Nonmagnetic | 99.06 | .51 | Al | 78.5 |
|  |  |  | Calculated feed | 100.0 | .643 | Al | 100.0 |
| Bauxite (144) | CO | 8 | Magnetic | 1.35 | 15.6 | Al | 37.2 |
|  |  |  | Nonmagnetic | [98.65] | .36 | Al | 62.8 |
|  |  |  | Calculated feed | 100.0 | .566 | Al | 100.0 |
| Bauxite (144) | CO | 0 | Magnetic | 1.04 | 16.0 | Al | 24.4 |
|  |  |  | Nonmagnetic | 98.96 | .52 | Al | 75.6 |
|  |  |  | Calculated feed | 100.0 | .681 | Al | 100.0 |
| Apatite (125) | H2 | 8 | Magnetic | 7.2 | 7.76/3.3 | Ca/P | 57.6/57.4/ |
|  |  |  | Nonmagnetic | 92.8 | .443/.19 | Ca/P | 42.4/42.6/ |
|  |  |  | Calculated feed | 100.0 | .970/.414 | Ca/P | 100.0 |
| Apatite (125) | H2 | 0 | Magnetic | 0.54 | 0.72 | P | 0.9 |
|  |  |  | Nonmagnetic | 99.46 | 0.43 | P | 99.1 |
|  |  |  | Calculated feed | 100.0 | 0.432 | P | 100.0 |
| Apatite (125) | CO | 8 | Magnetic | 0.18 | 1.61/.06 | Ca/P | 0.3/.03 |
|  |  |  | Nonmagnetic | 99.82 | .960/.37 | Ca/P | 99.7/99.97 |
|  |  |  | Calculated feed | 100.00 | .961/.369 | Ca/P | 100.0 |
| Apatite (125) | CO | 0 | Magnetic | 0.47 | 0.56 | P | 0.8 |
|  |  |  | Nonmagnetic | 99.53 | 0.308 | P | 99.2 |
|  |  |  | Calculated feed | 100.00 | 0.309 | P | 100.0 |
| Scheelite (135) | H2 | 8 | Magnetic | 10.4 | 1.90 | W | 43.2 |
|  |  |  | Nonmagnetic | 87.6 | 0.29 | W | 56.8 |
|  |  |  | Calculated feed | 100.0 | 0.458 | W | 100.0 |
| Scheelite (135) | H2 | 0 | Magnetic | 1.33 | 1.22 | W | 4.1 |
|  |  |  | Nonmagnetic | 98.67 | 0.38 | W | 95.9 |
|  |  |  | Calculated feed | 100.00 | 0.391 | W | 100.0 |
| Scheelite (135) | CO | 8 | Magnetic | 1.3 | 1.29 | W | 3.6 |
|  |  |  | Nonmagnetic | 98.7 | 0.46 | W | 96.4 |
|  |  |  | Calculated feed | 100.0 | 0.471 | W | 100.0 |
| Scheelite (155) | CO | 8 | Magnetic | 3.1 | 1.92 | W | 13.9 |
|  |  |  | Nonmagnetic | 96.9 | 0.38 | W | 86.1 |
|  |  |  | Calculated feed | 100.0 | 0.428 | W | 100.0 |
| Scheelite (165) | CO | 8 | Magnetic | 2.8 | 2.36 | W | 15.2 |
|  |  |  | Nonmagnetic | 97.2 | 0.38 | W | 84.8 |
|  |  |  | Calculated feed | 100.0 | 0.435 | W | 100.0 |
| Scheelite (165) | CO | 0 | Magnetic | 1.5 | 1.18 | W | 3.8 |
|  |  |  | Nonmagnetic | 98.5 | 0.45 | W | 96.2 |
|  |  |  | Calculated feed | 100.0 | 0.461 | W | 100.0 |
| Scheelite (135) | NH3 | 8 | Magnetic | 2.4 | 4.53 | W | 23.6 |
|  |  |  | Nonmagnetic | 97.6 | 0.36 | W | 76.4 |
|  |  |  | Calculated feed | 100.0 | 0.460 | W | 100.0 |
| Scheelite (135) | NH3 | 0 | Magnetic | 1.3 | 1.02 | W | 3.2 |
|  |  |  | Nonmagnetic | 98.7 | 0.40 | W | 96.8 |
|  |  |  | Calculated feed | 100.0 | 0.408 | W | 100.0 |
| Scheelite (135) | CH4 | 8 | Magnetic | 42.0 | 0.95 | W | 85.1 |
|  |  |  | Nonmagnetic | 58.0 | 0.12 | W | 14.9 |
|  |  |  | Calculated feed | 100.0 | 0.469 | W | 100.0 |
| Scheelite (135) | CH4 | 0 | Magnetic | 1.57 | 1.25 | W | 4.3 |
|  |  |  | Nomagnetic | 98.43 | 0.44 | W | 95.7 |
|  |  |  | Calculated feed | 100.00 | 0.45 | W | 100.0 |
| Scheelite (135) | C2H4 | 8 | Magnetic | 21.2 | 1.74 | W | 79.6 |
|  |  |  | Nonmagnetic | 78.8 | 0.12 | W | 20.4 |
|  |  |  | Calculated feed | 100.0 | 0.464 | W | 100.0 |
| Scheelite (135) | C2H4 | 0 | Magnetic | 1.23 | 1.42 | W | 3.7 |
|  |  |  | Nonmagnetic | 98.77 | 0.46 | W | 96.3 |
|  |  |  | Calculated feed | 100.00 | 0.471 | W | 100.0 |
| Pyrochlore (124) | H2 | 8 | Magnetic | 10.2 | 0.66 | Nb | 69.4 |
|  |  |  | Nonmagnetic | 89.8 | 0.033 | Nb | 30.6 |
|  |  |  | Calculated feed | 100.0 | 0.10 | Nb | 100.0 |
| Pyrochlore (124) | H2 | 0 | Magnetic | 1.04 | 2.4 | Nb | 24.7 |
|  |  |  | Nonmagnetic | 98.96 | 0.077 | Nb | 75.3 |
|  |  |  | Calculated feed | 100.00 | 0.10 | Nb | 100.0 |
| Hematite (125) | H2 | 8 | Magnetic | 0.96 | 39.0 | Fe | 37.1 |
|  |  |  | Nonmagnetic | 99.04 | 0.64 | Fe | 62.9 |
|  |  |  | Calculated feed | 100.00 | 1.01 | Fe | 100.0 |
| Hematite (125) | H2 | 0 | Magnetic | 0.14 | 22.5 | Fe | 3.4 |
|  |  |  | Nonmagnetic | 99.86 | 0.91 | Fe | 96.6 |
|  |  |  | Calculated feed | 100.00 | 0.94 | Fe | 100.0 |

EXAMPLE 6

A sample of scheelite was ground to minus 65-mesh and mixed with minus 65-mesh silica sand to produce a 3% synthetic ore. A sample of this ore was treated for 60 minutes with 16 kilograms of ferrous chloride per metric ton of feed with the temperature being slowly raised to 330° C. over this 60 minute treatment time. Another sample of this ore was also treated for 60 minutes with 16 kilograms of ferric chloride per metric ton of feed with the temperature being slowly raised to 330° C. over this time period. To obtain comparative results, another sample was treated exactly the same as the first two examples with the omission of the ferrous chloride ad ferric chloride. Table 6 contains the results of the magnetic separation of these samples.

monoxide, ammonia, and lower hydrocarbons in the range of about $C_1$ to $C_8$.

4. The process of claim 1 or claim 2 wherein the metal containing compound is a carbonyl.

TABLE 6

| IRON COMPOUND | DOSAGE (kg./m.ton) | PRODUCT | WEIGHT (%) | GRADE (%) | TUNGSTEN DISTRIBUTION (%) |
|---|---|---|---|---|---|
| None | — | Magnetic | 1.25 | 1.81 | 4.9 |
|  |  | Nonmagnetic | 98.75 | 0.444 | 95.1 |
|  |  | Calculated feed | 100.0 | 0.46 | 100.0 |
| $FeCl_2$ | 16 | Magnetic | 2.2 | 4.77 | 23.7 |
|  |  | Nonmagnetic | 97.8 | 0.345 | 76.3 |
|  |  | Calculated feed | 100.0 | 0.44 | 100.0 |
| $FeCl_3$ | 16 | Magnetic | 1.10 | 2.25 | 6.5 |
|  |  | Nonmagnetic | 98.90 | 0.36 | 93.5 |
|  |  | Calculated feed | 100.0 | 0.38 | 100.0 |

EXAMPLE 7

Samples of the same scheelite ore used in Example 6 were cotreated with ferrous chloride and hydrogen gas and ferric chloride and hydrogen gas. Each of these samples was treated for 60 minutes with 16 kilograms of the iron chloride per metric ton of feed. The temperature was slowly raised to 330° C. over this 60 minute treatment time. The hydrogen gas was introduced to the system prior to its heat-up at a rate of one reactor volume of hydrogen gas every 4.3 minutes for a period of 15 minutes. Comparative results were obtained by treating another sample of the ore to the same process with the omission of the iron chloride. All the samples were subjected to a magnetic separation process and Table 7 contains the comparative results of the different samples.

5. The process of claim 4 wherein the carbonyl is selected from the group consisting of iron, cobalt and nickel.

6. The process of claim 5 wherein the iron carbonyl comprises iron pentacarbonyl.

7. The process of claim 1 wherein the metal containing compound is an iron containing compound.

8. The process of claim 7 wherein the iron containing compound is selected from the group consisting of iron carbonyl, ferrocene, ferrocene derivatives, ferric acetylacetonate, ferric acetylacetonate derivatives, ferrous chloride and ferric chloride.

9. The process of claim 1 or claim 2 wherein the process is conducted at a temperature within a range of 125° C. less than the general decomposition temperature of the metal compound in a specific system for the ore

TABLE 7

| IRON COMPOUND | DOSAGE (kg./m.ton) | GAS | PRODUCT | WEIGHT (%) | GRADE (%) | TUNGSTEN DISTRIBUTION (%) |
|---|---|---|---|---|---|---|
| $FeCl_2$ | 16 | $H_2$ | Magnetic | 2.0 | 4.37 | 18.7 |
|  |  |  | Nonmagnetic | 98.0 | 0.389 | 81.3 |
|  |  |  | Calculated feed | 100.0 | 0.47 | 100.0 |
| $FeCl_3$ | 16 | $H_2$ | Magnetic | 1.28 | 2.37 | 8.4 |
|  |  |  | Nonmagnetic | 93.72 | 0.337 | 91.6 |
|  |  |  | Calculated feed | 100.0 | 0.36 | 100.0 |
| None | — | $H_2$ | Magnetic | 1.65 | 2.04 | 6.9 |
|  |  |  | Nonmagnetic | 98.35 | 0.461 | 93.1 |
|  |  |  | Calculated feed | 100.0 | 0.49 | 100.0 |

What is claimed is:

1. A process for beneficiating metal oxide ores selected from the group consisting of bauxite, apatite, and the metal oxides of Groups IIIB, IVB, VB, VIB, VIIB, VIIIB, IB, IIB and IVA which comprises contacting the metal oxide ore with a metal containing compound under conditions which cause the metal containing compound to react substantially at the surface of the metal oxide particles to the substantial exclusion of the gangue particles so as to alter the surface characteristics of the metal values thereby causing a selective enhancement of the magnetic susceptibility of the metal oxide values to the exclusion of the gangue in order to permit a physical separation between the values and the gangue.

2. The process of claim 1 wherein the metal oxide ore is cotreated with the metal containing compound and a reducing gas.

3. The process of claim 2 wherein the reducing gas is selected from the group consisting of hydrogen, carbon being treated.

10. The process of claim 1 or claim 2 wherein the metal containing compound is employed in an amount of from about 0.1 to 100 kilograms per metric ton of ore.

11. The process of claim 2 wherein the reducing gas is employed at a rate of at least about 1 percent of the reactor atmosphere.

12. A process for beneficiating metal oxide ores selected from the group consisting of bauxite, apatite, and the metal oxides of Groups IIIB, IVB, VB, VIB, VIIB, VIIIB, IB, IIB, and IVA which comprises contacting the metal oxide ore in a specific system with from about 0.1 to about 100 kilograms of a metal containing compound at a temperature within a range of 125° C. less than the general decomposition temperature of the metal containing compound in a specific system for the ore being treated for a period of time from about 0.05 to about 4 hours under conditions which cause the metal containing compound to react substantially at the surface of the metal oxide particles to the substantial exclusion of the gangue particles so as to alter the surface characteristics of the metal values thereby causing a selective enhancement of the magnetic susceptibility of the metal oxide values to the exclusion of the gangue in order to permit a physical separation between the values and the gangue.

13. The process of claim 12 wherein the metal oxide ore is cotreated with the metal containing compound and a reducing gas employed at a rate of at least about 10 percent of the reactor atmosphere.

14. The process of claim 12 or claim 13 wherein the metal containing compound is a carbonyl.

15. The process of claim 14 wherein the carbonyl is selected from the group consisting of iron, cobalt and nickel.

16. The process of claim 15 wherein the iron carbonyl comprises iron pentacarbonyl.

17. The process of claim 12 wherein the metal containing compound is an iron containing compound.

18. The process of claim 17 wherein the iron containing compound is selected from the group consisting of iron carbonyl, ferrocene, ferric acetylacetonate, ferrous chloride and ferric chloride.

19. The process of claim 1 or claim 12 wherein the mineral values are physically separated from the gangue by a magnetic separation process.

20. The process of claim 19 wherein the magnetic separation process is a wet magnetic process.

21. The process of claim 1 or claim 12 wherein the mineral values are physically separated from the gangue by an electrostatic technique.

22. The process of claim 12 wherein the metal containing compound is employed in an amount of from about 1 to about 50 kilograms per metric ton of ore and the process is carried out at a temperature within a range of 50° C. less than the general decomposition temperature of the metal containing compound in a specific system for the ore being treated for a period of time from about 0.15 to about 2 hours.

23. The process of claim 14 wherein the metal carbonyl is employed in an amount of from 1 to about 50 kilograms per metric ton of ore and the treatment process is carried out at a temperature within a range of 15° C. less than a general decomposition temperature of the metal carbonyl in a specific system for the ore being treated for a period of time from about 0.25 to about 1 hour.

24. The process of claim 13 wherein the metal containing compound is employed in an amount from about 1 to about 50 kilograms per metric ton of ore and the reducing gas is employed at a rate of about 100 percent reactor atmosphere.

25. A process for beneficiating metal oxide ores selected from the group consisting of taconite, bauxite, apatite, rutile, pyrochlore, uraninite, cuprite, cassiterite, carnotite, scheelite and hematite which comprises contacting the metal oxide ore in a specific system with from about 2 to about 20 kilograms of an iron containing compound per metric ton of ore at a temperature within a range of 125° C. less than the general decomposition temperature of the iron containing compound in the specific system for the ore being treated for a time period from about 0.15 to 2 hours under conditions which cause the iron containing compound to react substantially at the surface of the metal oxide particles to the substantial exclusion of the gangue particles so as to alter the surface characteristics of the metal values thereby causing a selective enhancement of the magnetic susceptibility of the metal oxide values to the exclusion of the gangue in order to permit a magnetic separation between the values and the gangue.

26. The process of claim 25 wherein the iron containing compound is iron pentacarbonyl and the temperature of the process is conducted within a range of about 15° C. less than the general decomposition temperature of the iron pentacarbonyl in the specific system for the ore being treated.

27. The process of claim 26 wherein the metal oxide ore is pyrochlore.

28. The process of claim 26 wherein the metal oxide ore is uraninite.

29. The process of claim 26 wherein the metal oxide ore is cuprite.

30. The process of claim 26 wherein the metal oxide ore is cassiterite.

31. The process of claim 26 wherein the metal oxide ore is rutile.

32. The process of claim 26 wherein the metal oxide ore is bauxite.

33. The process of claim 26 wherein the metal oxide ore is carnotite.

34. The process of claim 26 wherein the metal oxide ore is scheelite.

35. The process of claim 26 wherein the metal oxide ore is hematite.

36. The process of claim 26 wherein the metal oxide ore is apatite.

37. The process of claim 25 wherein the iron containing compound is ferrocene and the treatment is conducted at a temperature within a range of about 50° C. less than the general decomposition temperature of ferrocene in the specific system for the ore being treated.

38. The process of claim 37 wherein the metal oxide ore is bauxite.

39. The process of claim 37 wherein the metal oxide ore is scheelite.

40. The process of claim 37 wherein the metal oxide ore is carnotite.

41. The process of claim 37 wherein the metal oxide ore is apatite.

42. The process of claim 37 wherein the metal oxide ore is cuprite.

43. The process of claim 37 wherein the metal oxide ore is uraninite.

44. The process of claim 25 wherein the iron containing compound is ferric acetylacetonate.

45. The process of claim 44 wherein the metal oxide ore is bauxite.

46. The process of claim 44 wherein the metal oxide ore is scheelite.

47. The process of claim 44 wherein the metal oxide ore is carnotite.

48. The process of claim 44 wherein the metal oxide ore is apatite.

49. The process of claim 25 wherein the iron containing compound is ferrous chloride.

50. The process of claim 49 wherein the metal oxide ore is scheelite.

51. The process of claim 25 wherein the iron containing compound is ferric chloride.

52. The process of claim 51 wherein the metal oxide ore is scheelite.

53. The process of claim 25 wherein the metal oxide ore is cotreated with the iron containing compound and a reducing gas selected from the group consisting of hydrogen, carbon monoxide, ammonia, methane, and ethylene at a rate of about 100 percent reactor atmosphere.

54. The process of claim 53 wherein the iron containing compound is iron pentacarbonyl.

55. The process of claim 54 wherein the metal oxide ore is bauxite and the reducing gas is selected from the group consisting of hydrogen and carbon monoxide.

56. The process of claim 54 wherein the metal oxide ore is apatite and the reducing gas is selected from the group consisting of hydrogen and carbon monoxide.

57. The process of claim 54 wherein the metal oxide ore is scheelite.

58. The process of claim 54 wherein the metal oxide ore is hematite and the reducing gas is hydrogen.

59. The process of claim 53 wherein the metal oxide ore is scheelite, the iron containing compound is ferrous chloride and the reducing gas is hydrogen.

60. The process of claim 53 wherein the metal oxide ore is scheelite, the iron containing compound is ferric chloride and the reducing gas is hydrogen.

* * * * *